(12) United States Patent
Haimovich et al.

(10) Patent No.: US 6,255,958 B1
(45) Date of Patent: *Jul. 3, 2001

(54) ANTI-THEFT ELECTRONIC TAG

(75) Inventors: Yosef Haimovich, Rishon le Zion; Yehuda Armoni, Reut, both of (IL)

(73) Assignee: H-G-Tek Ltd., Or-Yehuda (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,121

(22) Filed: Mar. 3, 1999

(30) Foreign Application Priority Data

May 5, 1998 (IL) ........................................................ 124331

(51) Int. Cl.$^7$ ................................................ G08B 21/00
(52) U.S. Cl. .................. 340/686.6; 340/539; 340/568.2; 340/568.8
(58) Field of Search ............................. 340/686.6, 568.8, 340/568.2, 571, 539, 572.1, 572.8

(56) References Cited

U.S. PATENT DOCUMENTS

| | | | |
|---|---|---|---|
| 3,544,988 | * 12/1970 | Astheimer | 340/568.8 X |
| 4,000,488 | 12/1976 | Ephraim | 340/568.2 |
| 4,101,876 | * 7/1978 | Lurkis et al. | 340/568.8 X |
| 4,620,182 | * 10/1986 | Keifer | 340/568.2 |
| 5,068,643 | * 11/1991 | Yashina | 340/571 |
| 5,475,367 | * 12/1995 | Prevost | 340/571 X |
| 5,612,675 | 3/1997 | Jennings et al. | 340/573.1 |
| 5,767,772 | * 6/1998 | Lemaire et al. | 340/571 |
| 5,836,002 | * 11/1998 | Morstein et al. | 340/568.1 |
| 5,861,807 | * 1/1999 | Leyden et al. | 340/568.2 |
| 5,936,525 | * 8/1999 | Leyden et al. | 340/568.2 |
| 6,002,343 | 12/1999 | Auerbach et al. | 340/10.1 |

FOREIGN PATENT DOCUMENTS

| | | |
|---|---|---|
| 35 25 265 | 1/1987 | (DE) . |
| WO 90/07759 | 7/1990 | (WO) . |
| WO 92/12503 | 7/1992 | (WO) . |
| WO 93/21614 | 10/1993 | (WO) . |
| WO 97/38364 | 10/1997 | (WO) . |

* cited by examiner

Primary Examiner—Thomas Mullen
(74) Attorney, Agent, or Firm—Abelman, Frayne & Schwab

(57) ABSTRACT

An anti-theft tag assembly including an electronic tag, a monitored attachment mechanism which attaches the tag to an object to be protected and which provides an output indication of tampering with the attachment mechanism, a monitored proximity determination mechanism which monitors a proximity of the tag, and thus of the object to be protected, to a given object and which provides an output indication of tampering with the proximity determination mechanism, and a communicator for providing a sensible indication of receipt of at least one of the output indications.

8 Claims, 3 Drawing Sheets

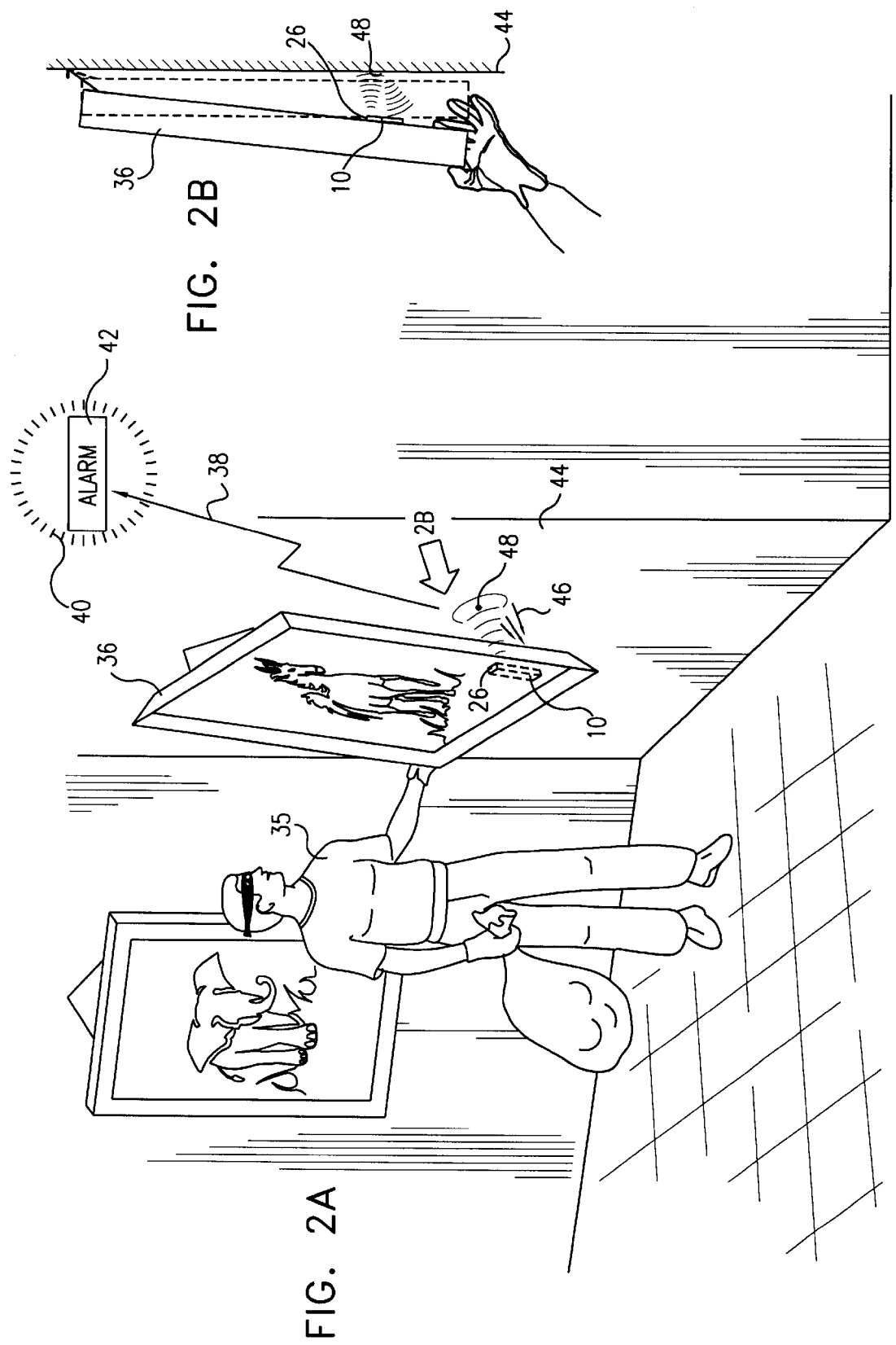

ANTI-THEFT ELECTRONIC TAG

FIELD OF THE INVENTION

The present invention relates to anti-theft devices generally, and particularly to anti-theft electronic tags for attaching to objects.

BACKGROUND OF THE INVENTION

It is known to attach to an object an electronic tag that can be monitored, sensed, or interrogated for purposes of preventing theft of the object. Such systems generally rely on the detection of tagged objects when they are removed from a designated area by one or more detectors positioned at various locations bounding the designated area.

Applicant/assignee's U.S. patent application Ser. No. 08/815,389, the disclosure of which is incorporated herein by reference, describes a battery-operated electronic tag that, when tampered with, communicates via a transceiver to a detection system for providing an alarm signal or other indication, and thereby detect the tampering and/or removal of the tag from a tagged object.

SUMMARY OF THE INVENTION

The present invention seeks to provide an improved multi-purpose tamper-resistant anti-theft tag assembly capable of detecting the removal of an object to which the tag is attached.

There is thus provided in accordance with a preferred embodiment of the present invention an anti-theft tag assembly including an electronic tag, a monitored attachment mechanism which attaches the tag to an object to be protected and which provides an output indication of tampering with the attachment mechanism, a monitored proximity determination mechanism which monitors a proximity of the tag, and thus of the object to be protected, to a given object and which provides an output indication of tampering with the proximity determination mechanism, and a communicator for providing a sensible indication of receipt of at least one of the output indications. Preferably the communicator includes a wireless communicator.

In accordance with a preferred embodiment of the present invention the communicator distinguishes between the output indication of tampering with the attachment mechanism and the output indication of tampering with the proximity determination mechanism.

Further in accordance with a preferred embodiment of the present invention the monitored attachment mechanism includes a sticker which is frangible upon becoming unstuck, thereby providing the output indication of tampering with the attachment mechanism.

Still further the monitored attachment mechanism includes a frangible element, which when broken provides the output indication of tampering with the attachment mechanism.

Additionally in accordance with a preferred embodiment of the present invention the monitored proximity determination mechanism includes a transceiver which transmits energy onto a surface of the given object and senses energy received therefrom.

In accordance with a preferred embodiment of the present invention the monitored proximity determination mechanism is operative to sense the proximity of the tag to a particular location on the surface of the given object.

Additionally in accordance with a preferred embodiment of the present invention the monitored proximity determination mechanism monitors a unique characteristic of energy reflected from a particular location on the surface of the given object back to the tag.

Further in accordance with a preferred embodiment of the present invention the communicator includes a wireless communicator which provides a signal indicating tampering to a remote location.

BRIEF DESCRIPTION OF THE DRAWINGS

The present invention will be understood and appreciated more fully from the following detailed description, taken in conjunction with the drawings in which:

FIGS. 2A and 2B are simplified illustrations of the operation of the anti-theft tag assembly of FIGS. 1A–1D.

DETAILED DESCRIPTION OF A PREFERRED EMBODIMENT

Figure 1A:
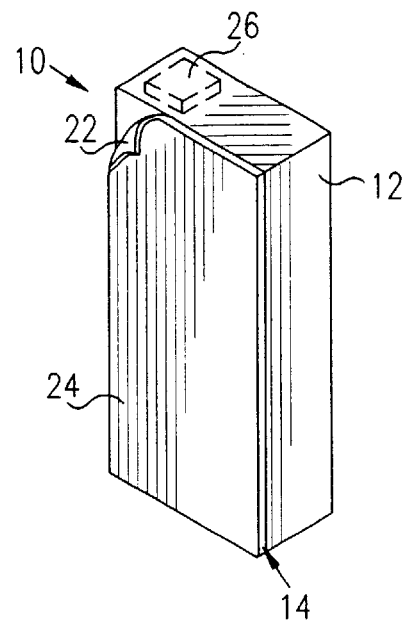
FIGS. 1A–1D are simplified pictorial illustrations of an anti-theft tag assembly constructed and operative in accordance with a preferred embodiment of the present invention.
Figure 1B:
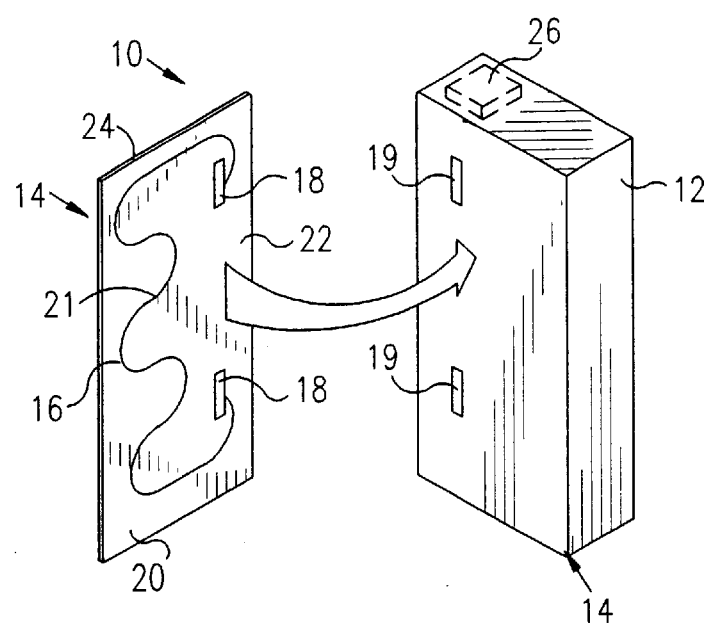
Figure 1C:
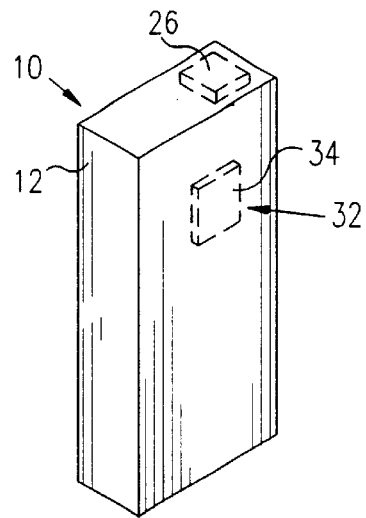

Reference is now made to FIGS. 1A–1C which illustrate an anti-theft tag assembly 10 constructed and operative in accordance with a preferred embodiment of the present invention. Assembly 10 preferably includes an electronic tag 12 and a monitored attachment mechanism 14 which is capable of attaching tag 12 to an object to be protected (shown in FIG. 2) and which provides an output indication of tampering with attachment mechanism 14, as will be described herein below.

Electronic tag 12 is preferably constructed in accordance with the teachings of U.S. patent application Ser. No. 08/815,389, and as such, preferably houses electronics (not shown) comprising a battery, a receiver antenna, receiver circuitry, a transmitter antenna, transmitter circuitry, a microprocessor, a timer, a logic and memory component, an analog-to-digital (A/D) converter and a current source. The electronics of tag 12 is not limited to the abovementioned components, and may include more or less components, depending upon the application.

Monitored attachment mechanism 14 preferably includes an electrically resistive element 16 which is in electrical communication with the electronics of tag 12, such as via mating I/O pads 18 and 19, respectively. In the illustrated embodiment, monitored attachment mechanism 14 comprises a sticker 20 on which resistive element 16 is disposed. Resistive element 16 may be disposed on sticker 20 in a variety of manners. For example, sticker 20 may include a flexible material, such as polyester or polyimide films, e.g., MYLAR or KAPTON. Resistive element 16 may comprise a resistive ink 21, preferably polymer based, which is applied onto sticker 20. Resistive ink 21 may be applied in a variety of manners, e.g., screen printing, roller coating, dipping, transfer deposition, or any other process that provides a controlled coating. Resistive ink 21 may be printed on sticker 20 in any suitable pattern to provide a desired resistance value which may be adjusted after curing by laser trimming, abrasion or mechanical punching, for example. I/O pads 18 are connected to the pattern of resistive ink 21, pads 18 being in electrical communication with I/O pads 19 of tag 12, as mentioned above.

Sticker 20 is preferably a double-sided adhesive sticker so that one side of sticker 20 can be bonded to tag 12 with a first adhesive 22 and the other side to an object to be protected with a second adhesive 24. Preferably the adhesive strength of first adhesive 22 is greater than the adhesive strength of second adhesive 24 such that any attempt to peel, rip or otherwise unlawfully remove tag 12 from the object to be protected, causes shearing or other deformation of second adhesive 24 and alters the resistance of resistive element 16. Alteration of the resistance of element 16 may be stored in memory component (not shown) and/or may be transmitted via a communicator 26, such as a wireless transmitter, to a detection system (shown and described further hereinbelow with reference to FIG. 2), thereby providing a sensible indication of receipt of the output indication of tampering with attachment mechanism 14.

Figure 1D:
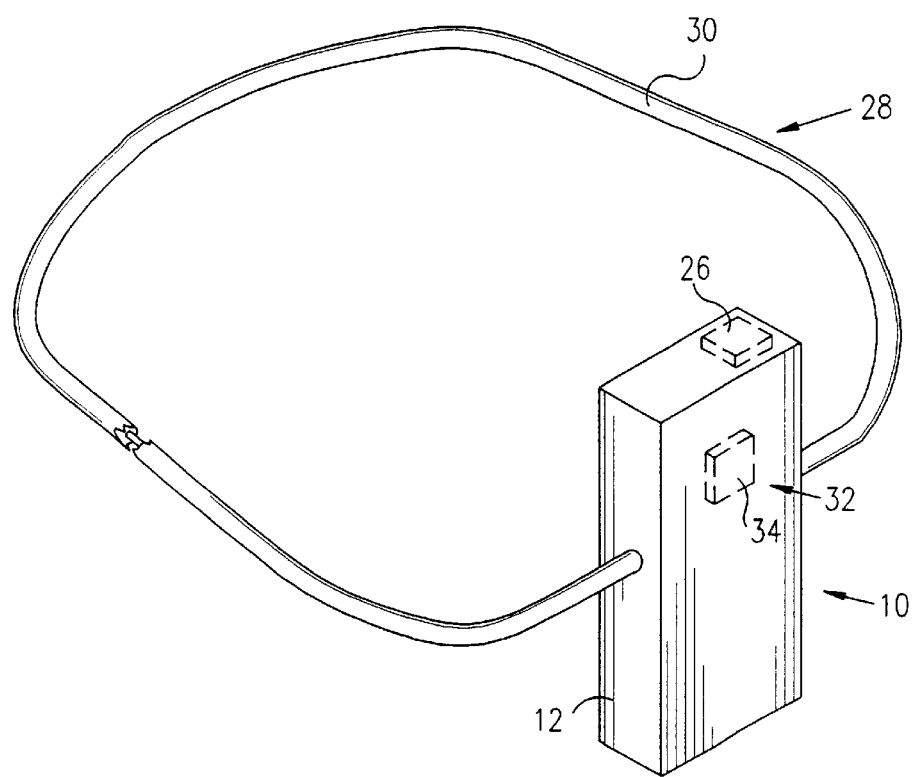

Reference is now made to FIG. 1D which illustrates a monitored attachment mechanism 28, constructed and operative in accordance with another preferred embodiment of the present invention, and used with assembly 10 in place of monitored attachment mechanism 14. In this embodiment, monitored attachment mechanism 28 comprises a frangible element 30, such as a shielded wire, which when broken provides an output indication of tampering with attachment mechanism 28.

In accordance with a preferred embodiment of the present invention assembly 10 includes a monitored proximity determination mechanism 32. Proximity determination mechanism 32 includes a transceiver 34, preferably optical, which transmits a wave of energy, preferably light, onto a surface of a given object and senses reflected energy (preferably light) received therefrom. Proximity determination mechanism 32 monitors a proximity of tag 12, and thus of an object to be protected, to a given object and provides an output indication of tampering with proximity determination mechanism 32. Communicator 26 is preferably in electrical communication with proximity determination mechanism 32 in order to provide a sensible indication of receipt of such an output indication.

Thus, communicator 26 provides a sensible indication of receipt of an output indication from either or both of attachment mechanism 14 (or 28) and proximity determination mechanism 32. Preferably, communicator 26 contains appropriate circuitry so as to distinguish between the output indications of attachment mechanism 14 (or 28) and proximity determination mechanism 32.

Reference is now made to FIGS. 2A and 2B which illustrate operation of the anti-theft tag assembly 10. A thief 35 is shown attempting to pilfer an object 36 to be protected, such as a painting in a museum. Anti-theft tag assembly 10 is mounted on the back of object 36. If thief 35 were to rip or otherwise remove tag assembly 10 off the back of object 36, attachment mechanism 14 provides an output indication of such tampering to communicator 26, as described hereinabove with reference to FIGS. 1A–1C. Communicator 26 provides a sensible indication of receipt of this output indication. For example, communicator 26 may itself emit an audible signal, such as a siren. Additionally or alternatively, communicator 26 may comprise a wireless transmitter which provides a signal 38 indicating tampering to a remote location 40. An alarm 42 may then be sounded at remote location 40.

As mentioned above, proximity determination mechanism 32 senses the proximity of tag 12 to a given object, such as a wall 44. If thief 35 were to pull object 36 away from wall 44, such as in the direction of arrows 46, proximity determination mechanism 32 senses the change in proximity of tag 12 to wall 44 and in response thereto, provides an output indication of tampering to communicator 26. Communicator 26 then either emits an alarm or communicates with alarm 42, as previously mentioned.

In accordance with a preferred embodiment of the present invention, proximity determination mechanism 32 senses the change in proximity of tag 12 to a particular location 48 on a surface of wall 44 instead of the change in proximity of tag 12 to any object placed at a predetermined distance from the tag. Preferably this is accomplished by transceiver 34 of proximity determination mechanism 32 not only sensing the distance of tag 12 to location 48 but also the intensity, or some other distinguishing characteristic, of the reflected energy (preferably light) received therefrom. The intensity of the light reflected from location 48 is random and unique for that particular location on wall 44, and proximity determination mechanism 32 stores this characteristic for monitoring any changes thereto.

The purpose and importance of such an embodiment will be best understood by means of the following example. If mechanism 32 were to merely sense the change in proximity of tag 12 to any point on wall 44, it would be possible to place a thin piece of some material, such as a paper, between tag 12 and wall 44. The thickness of the piece of paper could be chosen to be imperceptible by mechanism 32 so as not to cause sounding an alarm due to the change in proximity of tag 12 to wall 44. Thereupon, object 36 could be pulled away from wall 44, all the while holding the piece of paper in place. Since mechanism 32 would not sense any change in proximity of tag 12 to the piece of paper, no alarm would be sounded. However, by making mechanism 32 sense a unique characteristic of the reflected energy from particular location 48 on wall 44 back to tag 12, the alarm would be sounded even if the piece of paper were to be held opposite tag 12, because the reflected energy from the piece of paper is now different from the stored unique value corresponding to the energy reflected from particular location 48.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. An anti-theft tag assembly comprising:
   an electronic tag;
   a monitored attachment mechanism which attaches said tag to an object to be protected and which provides an output indication of tampering with said attachment mechanism;
   a wireless monitored proximity determination mechanism which monitors a proximity of the tag, and thus of said object to be protected, to a given object and which provides an output indication of proximity of said tag to said given object; and
   a communicator for providing a sensible indication of receipt of at least one of said output indications.

2. The anti-theft tag assembly according to claim 1 wherein said communicator comprises a wireless communicator.

3. The anti-theft tag assembly according to claim 1 wherein said communicator distinguishes between said output indication of tampering with said attachment mechanism and said output indication of proximity.

4. The anti-theft tag assembly according to claim 1 wherein said monitored attachment mechanism comprises a sticker which is frangible upon becoming unstuck, thereby providing said output indication of tampering with said attachment mechanism.

5. The anti-theft tag assembly according to claim 1 wherein said monitored attachment mechanism comprises a frangible element, which when broken provides said output indication of tampering with said attachment mechanism.

6. The anti-theft tag assembly according to claim 1 wherein said monitored proximity determination mechanism comprises a transceiver which transmits energy onto a surface of said given object and senses energy received therefrom.

7. The anti-theft tag assembly according to claim 6 wherein said monitored proximity determination mechanism senses the proximity of said tag to a particular location on said surface of said given object.

8. The anti-theft tag assembly according to claim 6 wherein said monitored proximity determination mechanism monitors a unique characteristic of energy reflected from a particular location on said surface of said given object back to said tag.

* * * * *